United States Patent [19]
Goor

[11] Patent Number: 5,842,737
[45] Date of Patent: Dec. 1, 1998

[54] CHILD SAFETY SEAT

[76] Inventor: Dan Goor, 1050C Fontmore Rd., Colorado Springs, Colo. 80904

[21] Appl. No.: 909,192

[22] Filed: Aug. 11, 1997

Related U.S. Application Data

[63] Continuation of Ser. No. 656,390, May 31, 1996, which is a continuation-in-part of Ser. No. 519,312, Aug. 25, 1995, which is a continuation-in-part of Ser. No. 201,200, Feb. 24, 1994, Pat. No. 5,468,047.

[51] Int. Cl.$^6$ ........................................................ B60N 2/26
[52] U.S. Cl. ................................. 297/216.11; 297/256.15; 297/487; 297/250.1
[58] Field of Search .............................. 297/184.13, 487, 297/488, 216.11, 256.15, 184.11, 250.1

[56] References Cited

U.S. PATENT DOCUMENTS

| | | |
|---|---|---|
| 1,230,642 | 6/1917 | V. Albano . |
| 1,732,647 | 10/1929 | Flintermann . |
| 2,577,089 | 12/1951 | Mondy . |
| 4,027,915 | 6/1977 | Anderson et al. . |
| 4,440,331 | 4/1984 | Schimmels . |
| 4,480,870 | 11/1984 | von Wimmersperg . |
| 4,501,032 | 2/1985 | Heath et al. . |
| 4,579,385 | 4/1986 | Koenig . |
| 4,583,780 | 4/1986 | Finn . |
| 4,681,368 | 7/1987 | Heath et al. . |
| 4,707,024 | 11/1987 | Schräder . |
| 5,054,853 | 10/1991 | Gillies et al. . |
| 5,178,438 | 1/1993 | Beger . |
| 5,322,343 | 6/1994 | Parker et al. . |
| 5,382,072 | 1/1995 | Diefenbach . |

FOREIGN PATENT DOCUMENTS

| | | |
|---|---|---|
| 0270035 | 2/1993 | European Pat. Off. . |
| 3422695 | 3/1995 | Germany . |
| 4344812 | 6/1995 | Germany . |
| 19509433 | 9/1995 | Germany . |
| 2270834 | 3/1994 | United Kingdom . |

*Primary Examiner*—Milton Nelson, Jr.
*Assistant Examiner*—Anthony D. Barfield
*Attorney, Agent, or Firm*—Weingarten, Schurgin, Gagnebin & Hayes LLP

[57] ABSTRACT

A safety seat provides improved occupant protection, especially in a vehicle equipped with a passenger-side air bag when the seat is positioned with the occupant facing rearward. The safety seat includes a head protector configured to deflect a forward facing portion of the seat downward upon interaction with an inflating air bag. The child safety seat, when occupied, has a center of gravity that causes a belt retaining the seat to be tightened for proper retention of the child seat during a collision and subsequent air bag inflation. The child safety seat can include one or more longitudinal members to strengthen the seat, provide additional head and torso protection, and transfer impact forces away from the head protector. In another embodiment the safety seat includes a cradle suspended in a frame by shock-isolating mounts. In an additional embodiment, a child safety seat includes two opposing frame rails, each frame rail including a side frame element. A pivot element, shock mounted on each of two ends to a respective side frame element, extends between the side frame elements. A lower shock mount is attached to a lower section of the frame. A cradle is resiliently suspended within the frame. The cradle is rotatably mounted to the pivot element at a first end, and attached to the lower shock mount at a second end. Additionally, an air bag impact surface is provided along a section of the frame. The air bag impact surface is pivotable at a first end with respect to the frame, and the second end of the air bag impact surface has a shock absorbing element positioned between it and the frame.

9 Claims, 9 Drawing Sheets

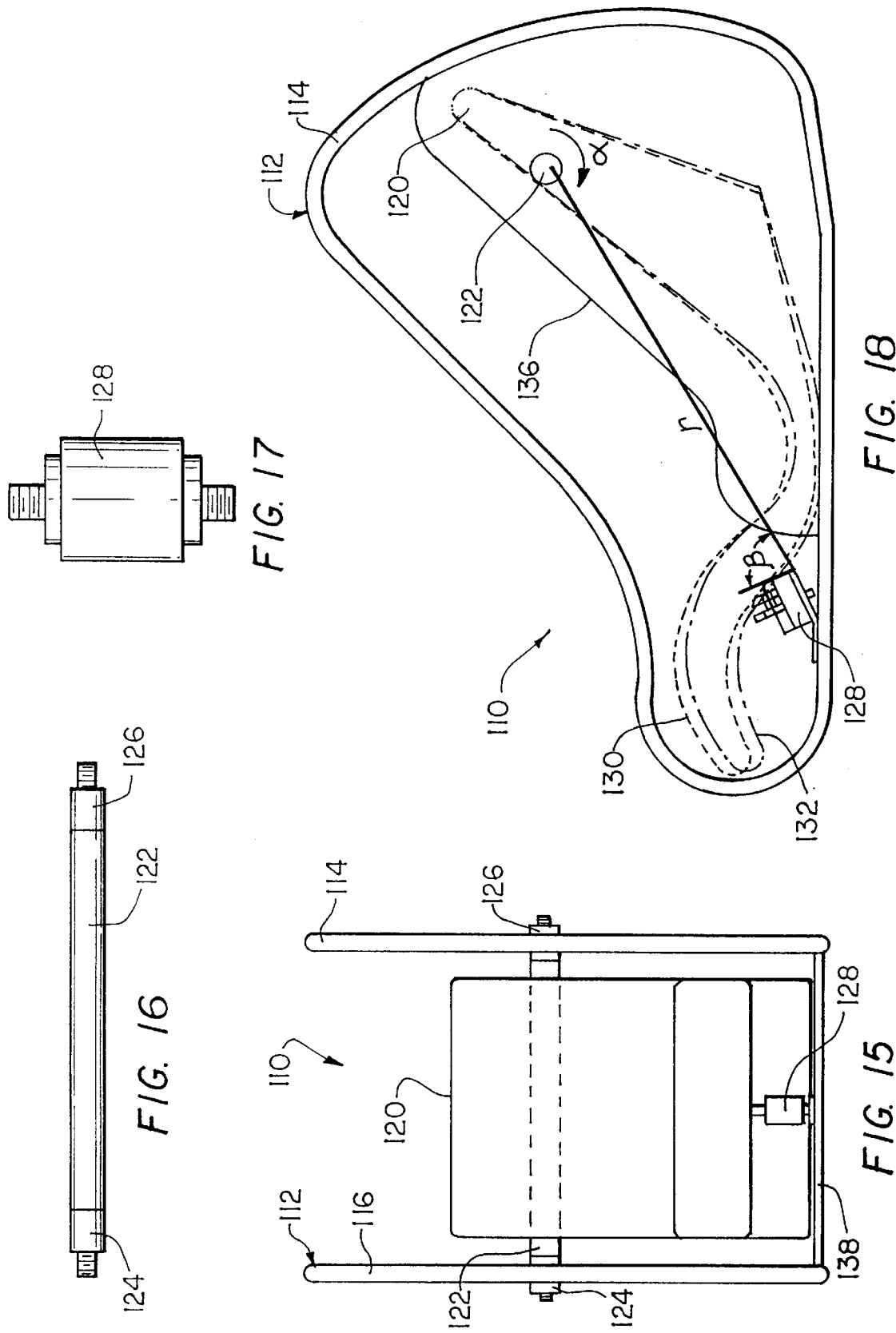

CHILD SAFETY SEAT

RELATED APPLICATIONS

This application is a continuation of prior application Ser. No. 08/656,390, filed May 31, 1996 entitled: CHILD SAFETY SEAT; which is a continuation-in-part of application Ser. No. 08/519,312, filed Aug. 25, 1995, entitled: CHILD SAFETY SEAT; which is a continuation-in-part of application Ser. No. 08/201,200, filed Feb. 24, 1994, entitled: CHILD SAFETY SEAT now U.S. Pat. No. 5,468,047.

FIELD OF THE INVENTION

The present invention relates to a child safety seat, and more particularly to a child safety seat for use in air bag equipped vehicles.

BACKGROUND OF THE INVENTION

All fifty states have laws requiring infants and small children to be restrained while in an operating motor vehicle. In many states, these laws mandate the use of a child safety seat for children up to the age of four years. In recent years, an increasing number of vehicles have been equipped with passenger-side air bags; and by 1996 it is expected that all automobiles produced in the United States will be so equipped.

Although child seat manufacturers routinely warn purchasers to secure the child safety seat in the center of the rear-seat, it is not uncommon for the seat to be placed in the front, passenger-side seat. However, the failure to follow the manufacturer's instructions presents a serious safety risk to a child in the improperly installed safety seat, especially when the child is within a height and weight range wherein it is recommended to position the child seat in a rearward facing manner. Alarmingly, the safety risk to a child seated in a rearward facing seat is even greater when a car is equipped with a passenger-side air bag.

Various studies have shown that the interaction between a rear facing infant seat and a front passenger-side air bag can result in excessive head and chest acceleration, causing serious and perhaps fatal injury to an infant occupant. For example, the air bag/seat interaction produces accelerations of an infant's head exceeding 100 G's at bag impact and Head Injury Criterion (HIC) values ranging from 650 to 1300. By contrast, rear facing seats not experiencing air bag interaction produce head accelerations of about 50 G's and HIC values generally less than 300 when crash tested at a standardized test speed of 48 km/hr. Interestingly, one study has noted that head acceleration remains high in the presence of a rear facing child seat/air bag interaction regardless of the level of crash severity.

It would therefore be desirable to provide a child safety seat that will protect a child despite improper installation of the safety seat in the front-seat, or improper tensioning of restraint belts, especially when the safety seat is rearward facing. It would also be desirable to provide a safety seat that isolates the occupant from vehicle motion and impact forces.

SUMMARY OF THE INVENTION

The present invention overcomes the disadvantages described above by providing improved occupant protection in all vehicles, and especially vehicles equipped with a passenger-side air bag. The child safety seat includes a head protector configured to deflect a forward facing (with respect to the interior of a vehicle) portion of the seat downward upon interaction with an inflating air bag, while reducing the force per unit area in the region of air bag interaction. The weight distribution of the safety seat causes a belt retaining the safety seat to be tightened for proper retention of the child safety seat during a collision and subsequent air bag inflation.

In an exemplary embodiment, a child safety seat includes a base having ends that define a plane. A backrest is secured to the base at an obtuse angle with respect to the plane, and a head protector is secured to the backrest at an acute angle with respect to the plane. A longitudinal member, such as a U-shaped bar, can be secured to the head protector and a portion of the base.

In another embodiment, a child safety seat includes a cradle resiliently suspended between and movable with respect to a frame.

In an additional embodiment, the child safety seat includes a frame constituting a first frame rail and an opposing second frame rail. The first frame rail includes a first side frame element, and the second frame rail includes a second side frame element. Also included is a pivot element having a shock mount on each of two ends. The pivot element is shock mounted on a first end to the first side frame element and shock mounted on a second end to the second side frame element. A lower shock mount is attached to one end of the frame. A cradle having apertures on each of two sides for receiving the pivot element therethrough is rotatable about the pivot rod between a first position and a second position. The cradle is also in contact with the lower shock mount. The cradle is resiliently suspended within the frame by the pivot element and the lower shock mount. Alternately an air bag impact surface may be provided, the air bag impact surface pivotally attached at one end to the frame. A shock absorbing element is provided between the other end of the air bag impact surface and the frame.

BRIEF DESCRIPTION OF THE DRAWING

The invention will be more fully understood by reference to the following detailed description when considered in conjunction with the accompanying drawings, in which:

FIG. 15 is a front view of an additional embodiment of a child safety seat;

FIG. 16 front view of a shock-mounted pivot element;

FIG. 17 is a front view of a lower shock mount assembly;

FIG. 18 is a side view of the child safety seat of FIG. 15;

DETAILED DESCRIPTION OF THE INVENTION

Figure 1:
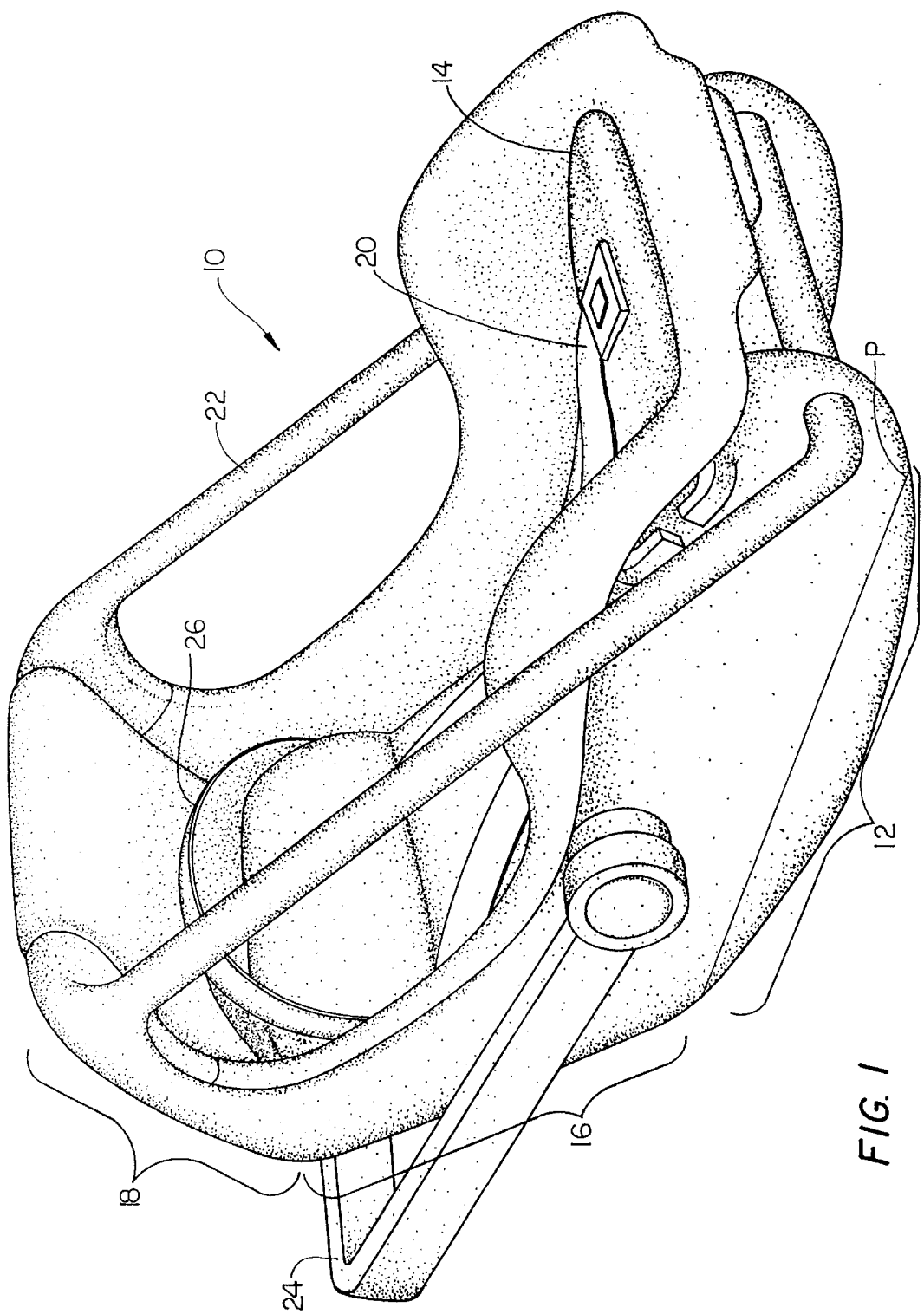
FIG. 1 is a perspective view of a child safety seat of the invention.

FIG. 1 is a perspective view of a child safety seat 10 of the present invention. The child safety seat 10 includes a base 12 having a first end and a second end, wherein a plane "P" is defined by the two ends. The base defines a cavity into which padded seating cushions 14 are disposed, the base 12 being either secured to or integrally formed with a backrest 16 disposed at an obtuse angle with respect to the plane defined by the ends of the base. A head protector 18 extends outwardly from the backrest 16 at an acute angle with respect to the plane "P," wherein the acute angle is selected to orient the head protector 18 with respect to a normal inflation direction of an air bag (not shown) so as to present a surface against which the air bag can make contact in a predictable manner as it inflates. The head protector 18 can either be secured to the backrest 16 or formed integrally therewith. One or more seatbelts 20 are provided to secure an infant into the child safety seat 10.

As illustrated in FIG. 1, two members 22 extend longitudinally from the head protector 18 to a portion of the base 12 proximate the end of the base opposite the head protector. In the exemplary embodiment, the members comprise a U-shaped bar having a central region that passes through apertures, such as holes, in the base 12. The bar can have a sponge-like texture or be covered with padding. In addition to providing a "cage" that further protects the head and torso of an infant, the members 22 reinforce the head protector 18, and transfer impact energy from the region of the head protector toward the opposite end of the base 12. Although, other embodiments of the members 22 are contemplated, such as solid sides or a more completely enclosed upper portion, the illustrated embodiment of the safety seat 10 provides excellent visibility of and for the infant.

Additionally, while the longitudinal members 22 provide sturdy hand grips for carrying the safety seat 10 when it is not in a vehicle, an adjustable carrying handle 24, movable through a range of lockable positions from that shown to upright, can also be provided. The carrying handle 24 can also be configured as an energy absorbing element which breaks in a controlled manner during a crash. Alternatively, the carrying handle 18 can be configured so that it moves with respect to the base 12, wherein the movement is inhibited to a preselected degree by resistive elements. The carrying handle 24 has further utility in that it can also serve as a leveling leg for the safety seat 10 to accommodate seat inclinations that differ from car to car.

Figure 2:
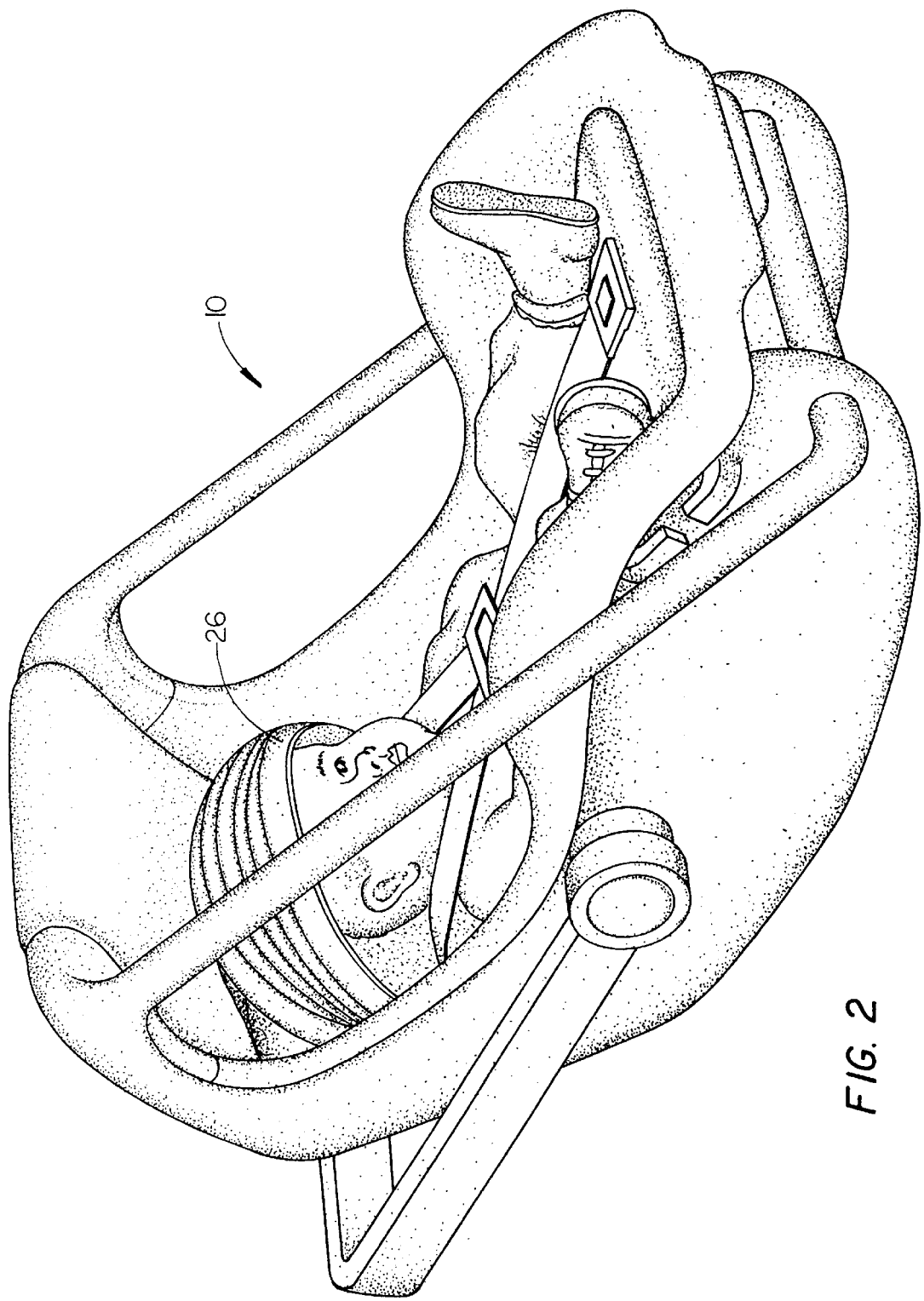
FIG. 2 is a perspective view of the child safety seat of FIG. 1 that illustrates an infant positioned within the seat and having an engaged supplemental head restraint.

Continuing to refer to FIG. 1, a supplemental head restraint 26 is illustrated that is movable between a rearward or disengaged position, away from a child's head, to a forward or engaged position, over the child's head as shown in FIG. 2. In the illustrated embodiment, the supplemental head restraint 26 is pivotally secured to a portion of the backrest 16 and resembles a pliant cap. The supplemental head restraint 26 can either be positioned over the child's head when it is strapped into the child seat 10 or left in the disengaged position. If the supplemental head restraint 26 is in its disengaged state upon vehicle impact, it is urged toward and over the infant's head, thus further restraining the infant's head subsequent to vehicle impact.

FIG. 2 is an illustration of the inventive child safety seat 10 showing an infant correctly positioned within the seat and restrained by the seatbelts 20. The supplemental head restraint 26 is illustrated in its engaged state over the infant's head. It should also be noted that the supplemental head restraint 26 is an excellent sun shield for the infant's head.

Figure 3:
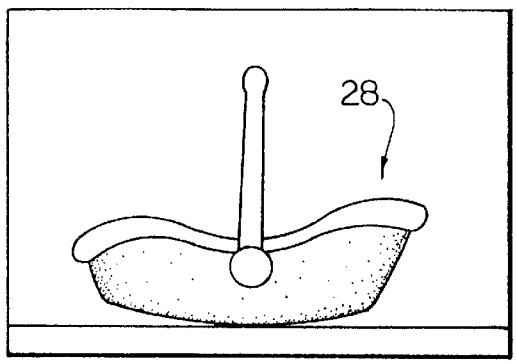
FIG. 3 is a side view of a prior art safety seat.
Figure 4:
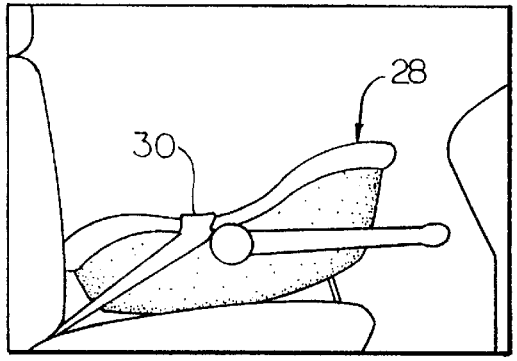
FIG. 4 is a side view of the prior art safety seat of FIG. 3 installed in a front-seat of a vehicle equipped with a passenger-side air bag.
Figure 5:
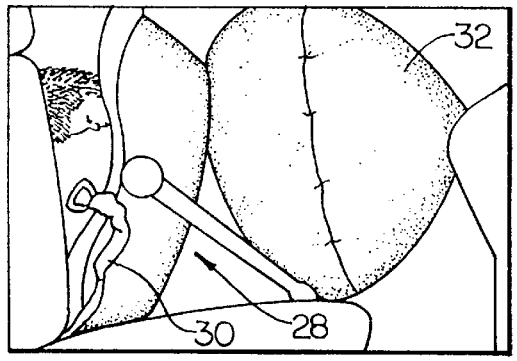
FIG. 5 is a side view of the prior art safety seat illustrated in FIG. 4 during air bag inflation.

To better understand the advantages of the inventive child safety seat 10, FIGS. 3, 4, and 5 illustrate the contrasting structure and behavior of a conventional child seat during a crash in a vehicle equipped with a passenger-side air bag. FIG. 3 is a side view of a prior art child seat 28. FIG. 4 illustrates the prior art child seat 28 positioned in a front, passenger side seat of a motor vehicle equipped with a passenger-side air bag. The child seat 28 is shown secured to the seat with a restraining belt 30.

FIG. 5 illustrates a typical interaction between the prior art child seat 28 and a passenger-side air bag 32 during a frontal collision. It should be especially noted that the forwardmost portion of the child seat 28, proximate the infant's head, catches the air bag 32 during air bag inflation. As the air bag 32 continues to inflate, it lifts the forwardmost portion of the child seat 28 upward causing the infant's head to be rapidly pushed toward the seat back. At this point the restraining belt 30 has become loose. Thus, as the air bag 32 deflates, the child seat 28 is able to recoil forward to the limit of the slack in the belt, further subjecting the infant to additional injurious acceleration and possible impact with the dashboard.

Figure 6:
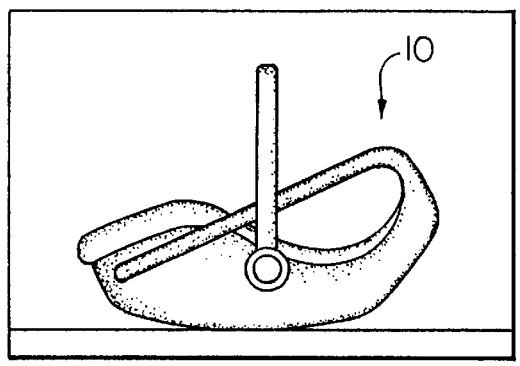
FIG. 6 is a side view of the child safety seat of the instant invention.
Figure 7:
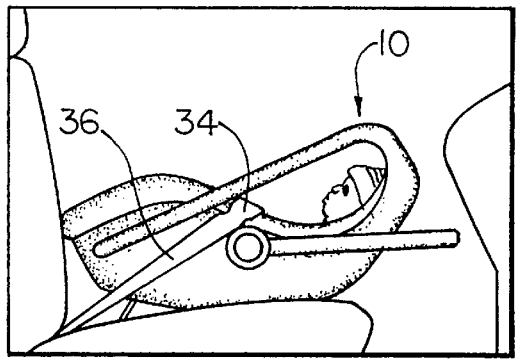
FIG. 7 is a side view of the child safety seat of FIG. 5 shown positioned in the front-seat of a vehicle having a passenger-side air bag.
Figure 8:
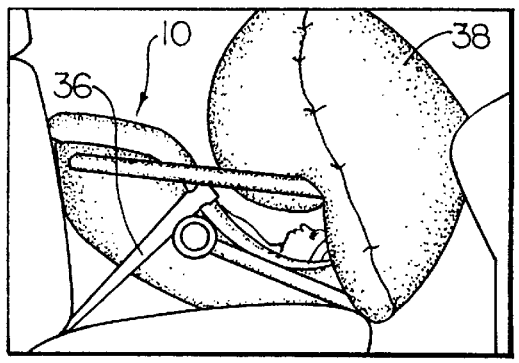
FIG. 8 is a side view of the child safety seat of the invention during passenger-side air bag inflation.

By contrast with the prior art child seat 28, FIGS. 6, 7, and 8 illustrate the advantageous child safety seat 10 of the invention. FIG. 6 is a side view of the safety seat 10, wherein several distinguishing features of the invention are readily apparent. Some of the distinguishing features including the head protector 18 and longitudinal members 22 which define a head and torso protecting cage, as well as provide for force transfer, have been discussed with respect to FIG. 1.

Additional distinguishing features of the child safety seat of the invention include a secure attachment, or restraining belt anchor point 34 for a restraining belt 36 at the juncture of the members 22 and the base 12, visible in FIG. 7, wherein the child safety seat 10 is shown strapped into the passenger-side, front-seat of a vehicle having a passenger-side air bag. The illustrated configuration of the anchor point 34 ensures that the restraining belt 36 cannot slide off of the safety seat 10 as the safety seat moves forward during a frontal collision. It should also be noted that the child safety seat 10 is configured to raise the infant's feet and lower its head, in part to provide a center of gravity between the head protector 18 and the anchor point 34.

An advantage of this feature is shown in FIG. 8, wherein the child safety seat 10 is illustrated at one moment during the interaction between the safety seat 10 and an inflating air bag 38. As the air bag 38 inflates, it presses against the head protector 18 portion causing it to be thrust downward. The head protector 18 and the longitudinal members 22 prevent the air bag 38 from smothering the infant, yet permits it to remain proximate the infant's head in a protective relationship. As the contoured backrest 16 stabilizes on the vehicle seat, a large portion of the base 12 near the infant's feet is positioned against the vehicle seat back, thus aligning the longitudinal members 22 with a force vector imparted by the inflating air bag, thereby transferring energy from the head protector 14 to the vehicle seat with a reduced risk of seat failure. It should also be noted that downward rotation of the head protector 18 caused by interaction with the air bag 38 maintains the restraining belt 36 under tension. Thus, as the air bag 38 deflates, the child safety seat 10 moves minimally, further reducing the risk of injury to the infant. Notably, all of the above advantages can be obtained for a negligible manufacturing cost.

Figure 9:
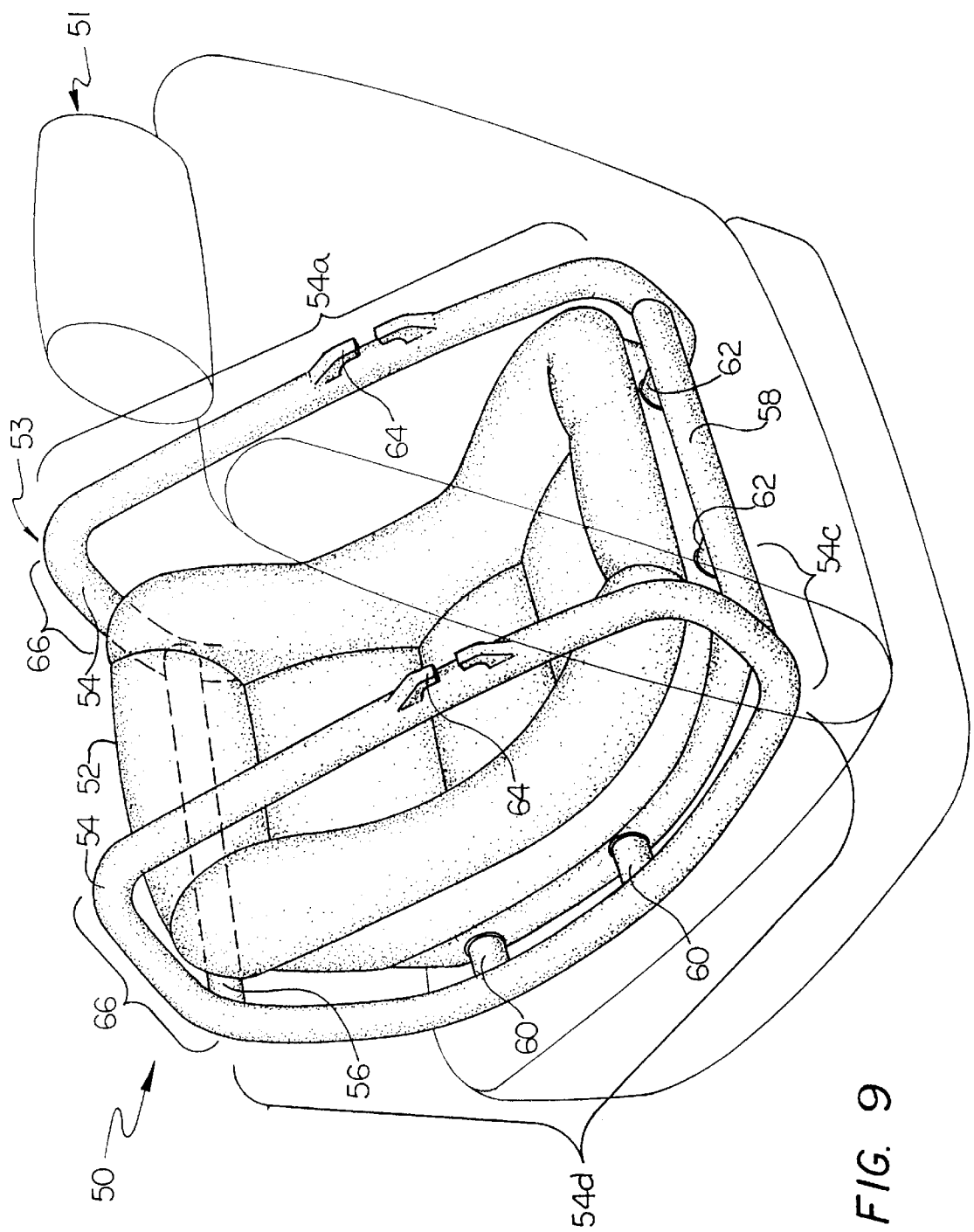
FIG. 9 is a perspective view of a second embodiment of the child safety seat of the invention.

FIG. 9 shows another embodiment of the child safety seat 50 shown placed on a typical vehicle seat 51. The child safety seat 50 includes a cradle 52 resiliently suspended within a protective zone defined by a frame 53. The exemplary frame 53 includes two opposing side frame elements 54. Each side frame element 54 can have a side profile larger than a side profile of the cradle 52 as required to define a protective zone around and/or over the cradle. The side frame elements can have various configurations and can include a sheet or multiple sheets of solid or perforate material and/or shaped tubes, bars or rails.

In FIG. 9, the side frame elements 54 are shown as closed loops of rigid tubing, each loop having a top side 54*a* adjacent the top of the cradle, a front side 54*b* adjacent the head area of the cradle, a rear side 54*c* adjacent the foot area of the seat, and a bottom side 54*d* adjacent the bottom side of the cradle. However, in other configurations, the side frame elements 54 are not necessarily parallel and they can be angled with respect to each other to provide additional protection over the cradle and/or to alter the footprint to the seat.

A head rail 56 and a foot rail 58 can extend perpendicular to the side frame elements 54 and connect the side frame elements 54 at the head area and the foot area of the side frame elements 54, respectively, to form a single unitary frame 53. The cradle 52 is movably suspended within the boundaries of the frame 53 by one or more shock-mounts 60. The cradle 52 can also be connected to the foot rail 58 by one or more foot shock-mounts 62. The shock-mounts 60 and 62 can be rubber blocks, neoprene blocks, spring devices, or other shock isolating, or vibration reducing devices known to those skilled in the art. In other embodiments a non-unitary frame is provided by frame elements that support the cradle, but which do not have a rigid connection between each other.

FIG. 9 also shows an integral seat belt guide 64 formed within the top side of each side frame element 54. The frame 53 is configured so as to present a surface 66, at the head area of the seat 50, against which an airbag can make contact in a predictable manner as it inflates in a manner similar to that described with respect to FIG. 8.

As described with respect to seat 10 in FIG. 1, the frame 53 of seat 50 also transfers impact forces and energy from the head area of the seat 50 (nearest the expanding airbag) toward the foot area at the opposite end of the seat 50. The frame 53 transfers the forces and energy generated by an expanding airbag to the vehicle seat, while the cradle 52 is isolated from these forces by the shock-mounts 60 and 62. When the shock-mounts are positioned as shown, impact forces are directed to the base of the cradle where they can be more broadly distributed away from the child's head and neck.

Figure 10:
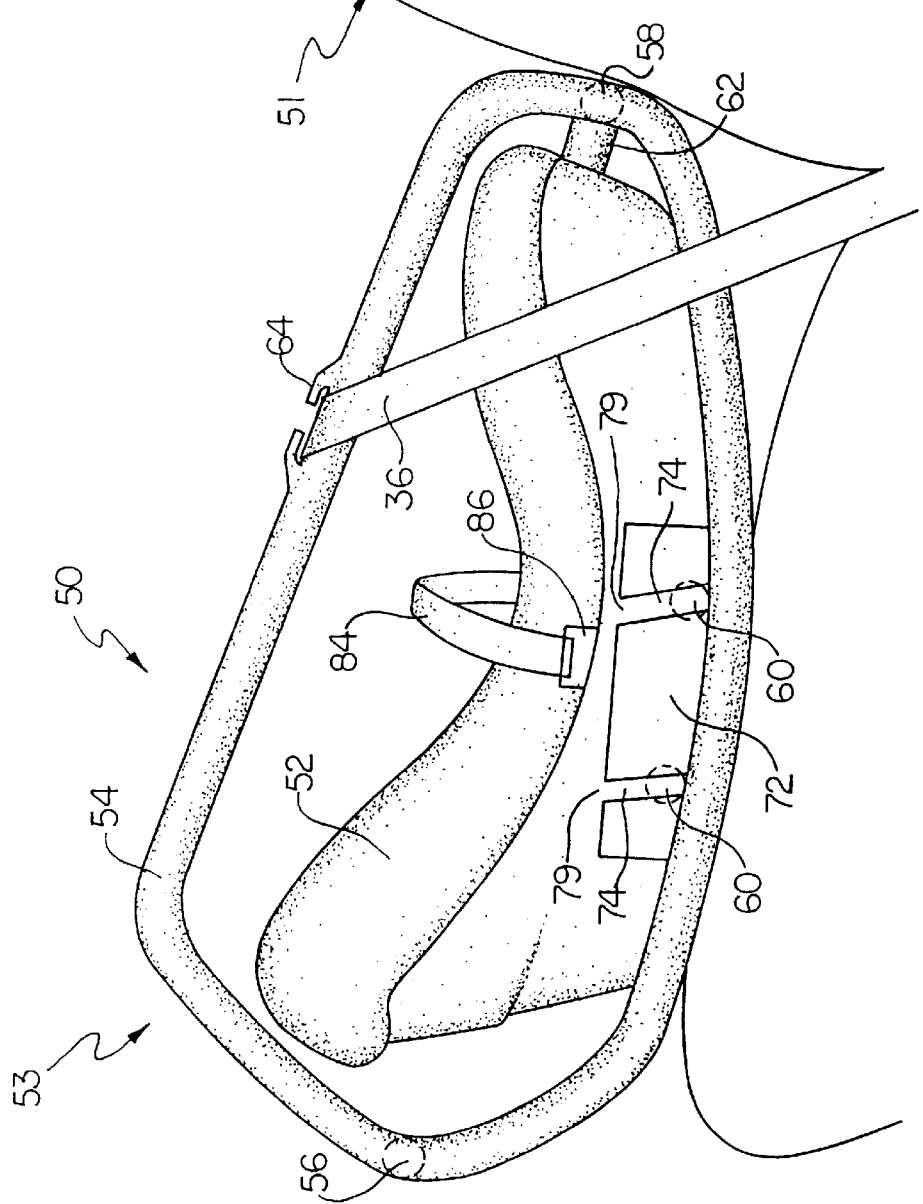
FIG. 10 is a side view of the child safety seat of FIG. 9.

FIG. 10 is a side view of the child safety seat 50 of the present invention, wherein the seat 50 is shown strapped into a passenger-side front-seat. As shown, the restraining belt 36 passes through the seat belt guides 64 on the side frame elements 54 to secure the safety seat 50 to the vehicle seat 51. A flexible carrying strap 84, is shown connected to a U-shaped bar or bolt 86, which is attached to the cradle 52. The carrying strap 84 can be used for carrying the cradle with an infant when the cradle 52 is detached from the frame 53. As discussed with respect to FIG. 9, the cradle 52 can be attached to the side frame elements 54 by side shock-mounts 60 and to the foot rail 58 by foot shock-mounts 62. Side shock-mounting plates 72 can be attached to the side frame elements 54, such as by welding, and can include grooves or tracks 74 directed upward for attaching side shock-mounts 60 from the side frame elements 54 to the cradle 52.

Figure 11:
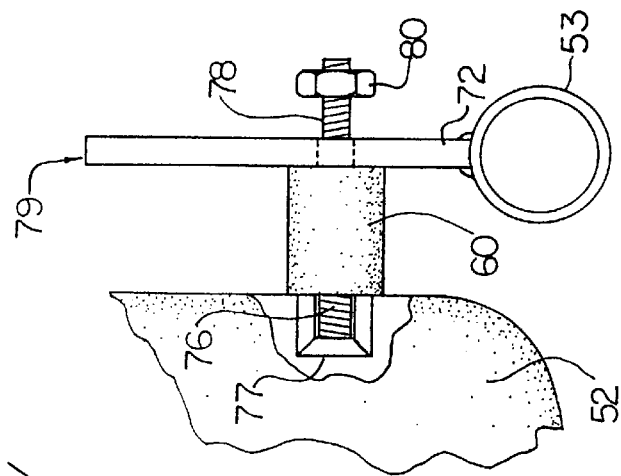
FIG. 11 is a side view of a side shock-mount assembly illustrated in FIG. 10.

Referring now to FIG. 11, the side shock-mounts 60 can have a first threaded bolt 76 by which the shock-mounts 60 are fastened to an internally threaded orifice 77 of the cradle 52. The side shock-mounts 60 can also have a second threaded bolt 78 that slides into the tracks 74 of the side shock-mounting plates 72 from an opening 79, shown in FIG. 10, at the top of the tracks 74. The second threaded bolt 78 is securely fastened to the side shock-mounting plates 72 by tightening of a locknut 80. Side shock-mounting plates 72 and tracks 74 are provided to allow detachment of the side shock-mounts 60 from the side shock-mounting plates 72 for removal of the cradle 52 from the frame 53.

Figure 12:
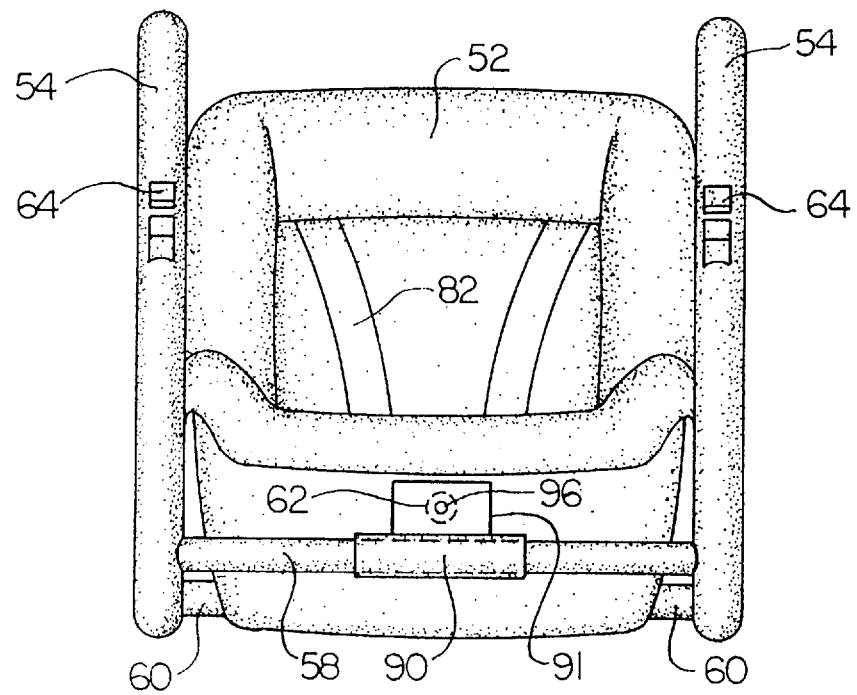
FIG. 12 is a front view of the child safety seat of FIG. 9.
Figure 13:
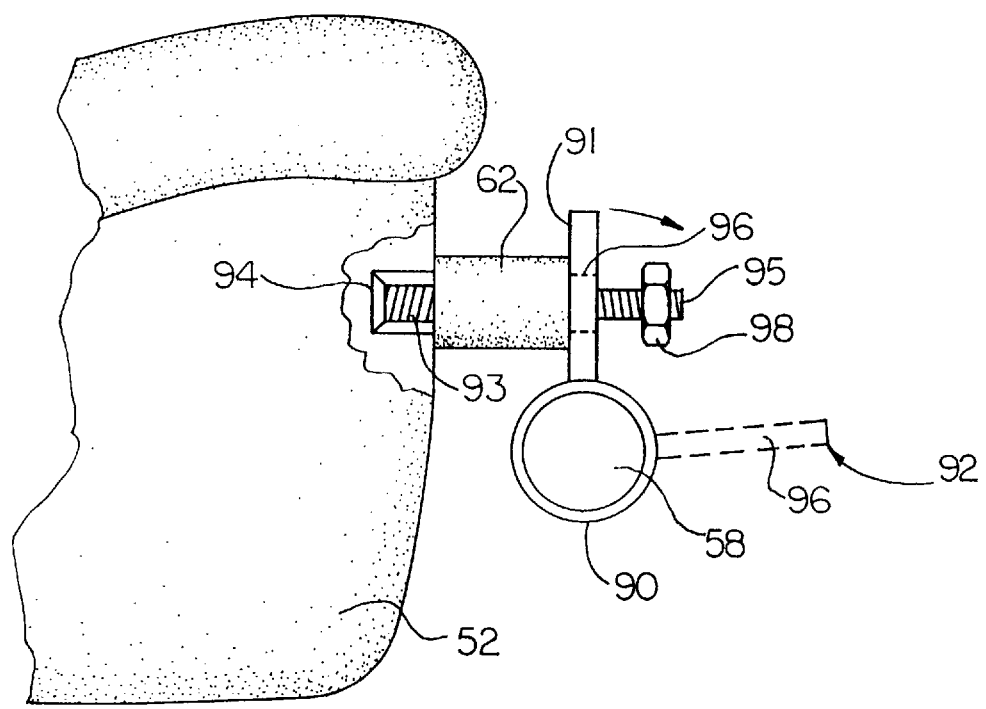
FIG. 13 is a side view of a foot shock-mount assembly of the child safety seas of FIG. 12.

FIG. 12 is a front view of the child safety seat 50. FIG. 12 shows seatbelts 82 for securing a child into the child safety seat 50. FIG. 12 and FIG. 13, taken together illustrate how the foot rail 58 can include a rotatable portion 90 for rotating a foot shock-mounting plate 91 in an outward direction from the cradle 52 to an outer position 92 to completely release the cradle 52 from the frame 53. Foot shock-mount 62 has a first threaded bolt 93 fastenable to an internally threaded orifice 94 of the cradle 52. The foot shock-mount 62 also has a second threaded bolt 95 which protrudes into an opening 96 of the foot shock-mounting plate 91. The second threaded bolt 95 is securely fastened to the foot shock-mounting plate 91 by tightening a locknut 98.

Figure 14:
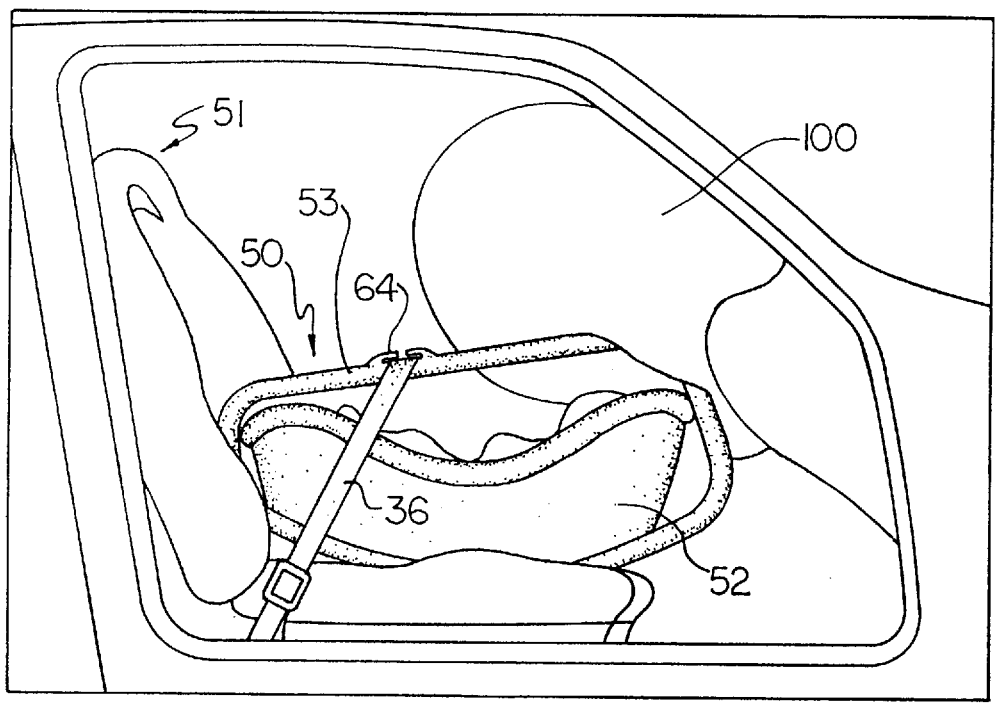
FIG. 14 is a side view of the child safety seat of FIG. 9 during passenger-side airbag inflation.

FIG. 14 illustrates the child safety seat 50 during passenger-side airbag inflation. The frame 53 defines a head and torso protecting cage, which also provides for force and energy transfer, as discussed with respect to FIGS. 1 and 9. As shown in FIGS. 10 and 14, the restraining belt 36 is held securely by the seat belt guide 64 on each side frame element 54, ensuring that the restraining belt 36 cannot slide off of the safety seat 50 as the safety seat moves forward during a frontal collision. As noted with respect to the child safety seat 10 in FIG. 7, the child safety seat 50 in FIG. 14, is configured to cause the infant's feet to raise and its head to lower, when an inflating airbag 100 contacts the child safety seat 50.

As shown in FIG. 14, as the airbag 100 inflates, it presses against the frame 53 causing the head area of the seat 50 to be thrust downward causing the vehicle restraining belt 36 to tighten on the frame 53 and not on the cradle 52. The frame 53 prevents the airbag 100 from smothering the child, while permitting the airbag 100 to remain proximate the child's head in a protective relationship. The downward rotation of the head area of the seat 50, caused by interaction with airbag 100, maintains the restraining belt 36 under tension. Hence, as the airbag 100 deflates, the child safety seat 50 minimally moves, further reducing the risk of injury to the child.

FIG. 15 illustrates a front view of another embodiment of a child safety seat 110. The child safety seat 110 includes a frame 112 which comprises a first frame rail 114 and a second frame rail 116, each frame rail including a side frame element (not shown). The safety seat 110 further includes a cradle 120 mounted resiliently within the frame 112. The cradle 120 includes seatbelts (not shown) for restraining an infant within the child safety seat 110. The cradle 120 also includes two sides having apertures sized to receive the pivot element 122. While a pivot element 122 comprising a rod is shown, it should be appreciated that any structure which allows the cradle to pivot between two positions within the frame 112 may be implemented. The pivot element 122 is installed through the cradle side apertures, thus the cradle 120 is rotatable about the pivot element 122. The pivot element 122 in this embodiment, shown in FIG. 16, includes a first shock mount 124 on a first end and a second shock mount 126 on a second end. Shock mount 124 is attached to side frame element 134, and shock mount 126 is attached to side frame element 136, thus the pivot element 122 is mounted between the side frame elements 134 and 136.

A lower shock mount 128, shown in FIG. 17, is positioned between the cradle 120 and the frame 112. The cradle 120 is movably suspended within the boundaries of the frame 112 by the shock mounted pivot element 122 and the lower shock mount 128. The lower shock mount 128 can be comprised of rubber blocks, neoprene blocks, spring devices, or other shock isolating, or vibration reducing devices known to those skilled in the art, as can the shock mounts 124 and 126 of pivot element 122.

Referring now to FIG. 18, the location of the pivot element 122 is preferably chosen to be proximate the area about an infant's head when an infant is properly situated within the safety seat 110. The lower shock mount 128 is preferably positioned at angle which is tangential to a ray that is orthogonal to an axis of rotation defined by the pivot element 122. During a frontal collision the cradle 120 of the child safety seat 110 will rotate, with the shock mounted pivot element 122 providing an axis of rotation. The lower shock mount 128 limits the amount of rotation from a first position 130 to a second position 132 and also dampens the rotation between the two positions. In such a manner, the force provided by the impact is transferred into a rotational force upon the cradle 120 within the frame 112, and the lower shock mount 128 further dampens and transfers the rotational force into an oscillatory motion between the first position 130 and the second position 132. Accordingly, acceleration forces about the pivot element 122 and therefore an infant's head when an infant is properly situated within the safety seat 110, are reduced.

By providing the cradle 120 with a pre-determined path of least resistance, the motion of the cradle 120 within the frame 112 is directed to reduce shock by increasing the energy absorption away from the cradle 120 and therefore an infant properly situated within the safety seat 110. By forcing the cradle 120 to rotate and oscillate between two positions rather than move straight, the amount of energy is reduced by the conversion from straight line energy to oscillatory rotational energy.

While the present embodiment shows a singular lower shock mount, it should be appreciated that any number of lower shock mounts could be utilized.

Although other embodiments of the frame side elements 134 and 136 are contemplated, such as solid sides or a more completely enclosed upper portion, the illustrated embodiment of the safety seat 110 provides excellent visibility of and for an infant situated within the seat 110. Each side frame element 134 and 136 can have a side profile larger than a side profile of the cradle 120 as required to define a protective zone around and/or over the cradle. The side frame elements 134 and 136 can have various configurations and can include a sheet or multiple sheets of solid or perforate material and/or shaped tubes, bars or rails.

The frame rails 114 and 116 are shown as closed loops of rigid tubing. However, in other configurations, the frame rails 114 and 116 are not necessarily parallel and they can be angled with respect to each other to provide additional protection over the cradle 120 and/or to alter the footprint to the seat 110.

A foot rail 138 can extend perpendicular to the side frame elements 134 and 136 and connect the side frame elements at the foot area to form a single unitary frame 112.

In other embodiments a non-unitary frame is provided by frame rails 114 and 116 and frame elements 134 and 136 that support the cradle 120, but which do not have a rigid connection between each other. A unitary frame surrounding the cradle may also be provided. Additionally, the pivot element is shown as a rod, however other embodiments such as bearings, hinges or other devices which allow for rotation between two surfaces may be incorporated. Further, while the rotational inhibitor is shown and described as a shock mount, it should be appreciated that other devices which serve to dampen movement such as torsion bars, spring, hydraulic or pneumatic devices and the like may be used as a rotational inhibitor. Also, while the rotational inhibitor is described and shown as attaching to a bottom portion of the frame, the rotational inhibitor could be placed at any location between along the frame, the cradle or the pivot element.

Figure 19:
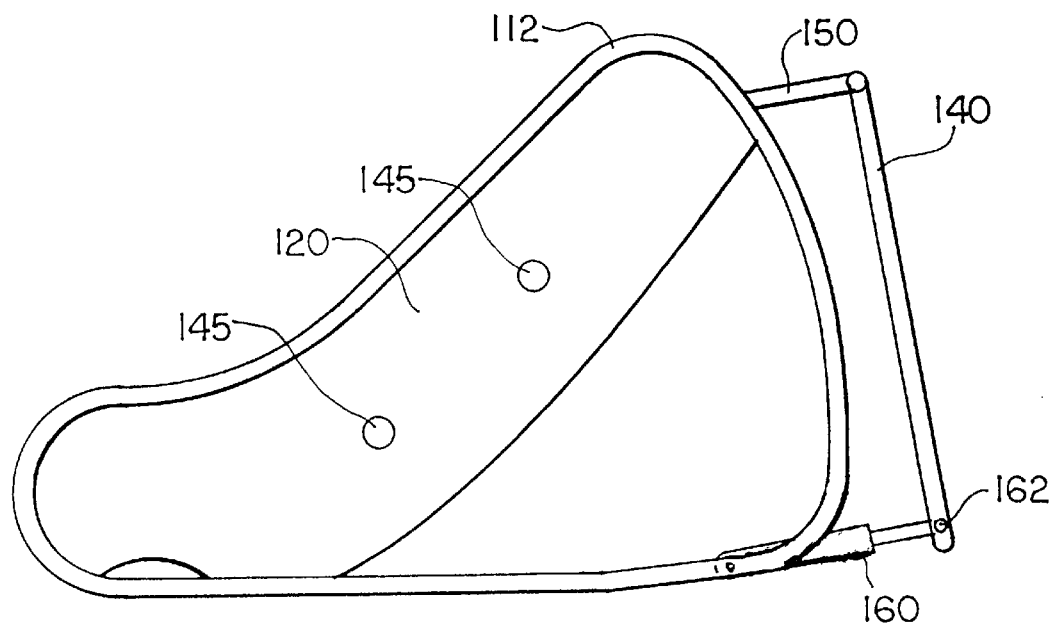
FIG. 19 is a side view of a child safety seat incorporating an air bag impact surface and a shock absorbing element.
Figure 19A:
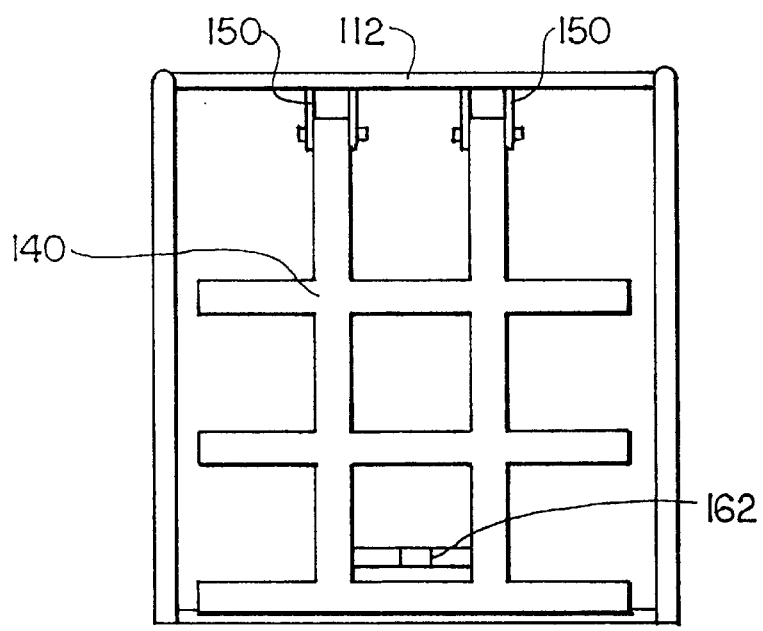
FIG. 19A is a rear view of the air bag impact surface and frame.

Referring now to FIGS. 19 and 19A, a child safety seat including an air bag impact surface 140 is shown. A cradle 120 is mounted within frame 112. One or more shock mounts 145 may be used in mounting the cradle 120 within frame 112. An air bag impact surface 140 is shown pivotally mounted to frame 112. Pivot elements 150 provide the pivotable mounting of the air bag impact surface 140 to the frame 112. Air bag impact surface 140 also includes a shock absorbing mount 162 for securing the air bag impact surface 140 to a shock absorbing element 160. In the event of an impact which deploys an air bag, the inflating air bag encounters air big impact surface 140 and causes it to rotate via pivot elements 150 toward cradle 120. The air bag impact surface 140 transmits the impact energy to shock absorbing element 160 which enlarges the duration of the shock pulse, reduces the shock force peak, while also directing the shock force away from the cradle 120.

In the illustrated embodiment the air bag impact surface 140 is shown as a tubular grid, though any shape or construction that allows the impact surface to receive the inflating air bag could be used. The illustrated embodiment also shows the pivotable mounting of the air bag impact surface 140 by hinges, though this could also be accomplished with bearings, a pivot rod, or other pivotable mounting elements as are known in the art. Any number of pivotable mounting elements may be used. Additionally, the shock absorbing element 160 is shown as a spring mechanism in the illustrated embodiment although any shock absorbing device such as a pneumatic shock absorber, a hydraulic shock absorber, or the like may also be utilized. While only a single shock absorbing element 160 and mount 162 are shown, multiple shock absorbing elements and respective mounts could be utilized, disposed at various locations between the frame 112 and the air bag impact surface 140.

Although the invention has been shown and described with respect to exemplary embodiments thereof, various other changes, omissions and additions and form in detail thereof, may be made therein without departing from the spirit and scope of the invention.

What is claimed is:

1. A child safety seat comprising:

a frame, a cradle disposed within said frame, an air bag impact element disposed outside of said frame;

a pivot element movably attaching said air bag impact element to said frame; and a shock absorbing element disposed between said frame and said air bag impact element wherein said air bag impact element is operative to transmit to said shock absorbing element a shock pulse resulting from an expanding air bag impacting said air bag impact element, and wherein said shock absorbing element is operative to enlarge a duration of the shock pulse, reduce a peak of the shock pulse and direct the shock pulse away from said cradle.

2. The child safety seat of claim 1 wherein said pivot element comprises a hinge.

3. The child safety seat of claim 1 wherein said pivot element comprises bearings.

4. The child safety seat of claim 1 wherein said pivot element comprises a pivot rod.

5. The child safety seat of claim 1 wherein said air bag impact element comprises a tubular grid.

6. The child safety seat of claim 1 wherein said shock absorbing element comprises a spring apparatus.

7. The child safety seat of claim 1 wherein said shock absorbing element comprises a hydraulic shock absorber.

8. The child safety seat of claim 1 wherein said shock absorbing element comprises a pneumatic shock absorber.

9. The child safety seat of claim 1 wherein said cradle is within said frame by at least one shock mount, said at least one shock mount having a first end connected to said frame and a second end connected to said cradle.

* * * * *